United States Patent
Vanapalli et al.

(10) Patent No.: US 11,443,277 B2
(45) Date of Patent: Sep. 13, 2022

(54) SYSTEM AND METHOD FOR IDENTIFYING OBJECT INFORMATION IN IMAGE OR VIDEO DATA

(71) Applicant: Fractal Analytics Private Limited, Mumbai (IN)

(72) Inventors: Prakash Vanapalli, Mumbai (IN); Vikash Challa, Mumbai (IN); Sachin Chandra Bonagiri, Telangana (IN); Suraj Amonkar, Mumbai (IN); Sarang Pande, Nagpur (IN); Samreen Khan, Mumbai (IN)

(73) Assignee: Fractal Analytics Private Limited, Mumbai (IN)

( * ) Notice: Subject to any disclaimer, the term of this patent is extended or adjusted under 35 U.S.C. 154(b) by 316 days.

(21) Appl. No.: 16/869,723

(22) Filed: May 8, 2020

(65) Prior Publication Data

US 2021/0304123 A1    Sep. 30, 2021

(30) Foreign Application Priority Data

Mar. 26, 2020   (IN) .............................. 202021013271

(51) Int. Cl.
| | | |
|---|---|---|
| G06Q 10/08 | (2012.01) | |
| G06Q 10/06 | (2012.01) | |
| G06K 9/62 | (2022.01) | |
| G06N 3/08 | (2006.01) | |
| G06F 16/51 | (2019.01) | |

(52) U.S. Cl.
CPC ........... *G06Q 10/087* (2013.01); *G06F 16/51* (2019.01); *G06K 9/628* (2013.01); *G06K 9/6257* (2013.01); *G06N 3/08* (2013.01); *G06Q 10/06393* (2013.01)

(58) Field of Classification Search
CPC ........... G06Q 10/087; G06Q 10/06393; G06F 16/54; G06N 3/08
See application file for complete search history.

(56) References Cited

U.S. PATENT DOCUMENTS

| | | | |
|---|---|---|---|
| 10,387,996 B2 | 8/2019 | Cohen et al. | |
| 2013/0004081 A1* | 1/2013 | Baba .................... | G06V 20/40 382/195 |
| 2018/0189763 A1* | 7/2018 | Olmstead ............... | G06Q 20/18 |

OTHER PUBLICATIONS

Van Kampen et al., SKU classification: A literature review and conceptual framework, International Journal of Operations and Production Management (2012).

* cited by examiner

*Primary Examiner* — Edward Park
(74) *Attorney, Agent, or Firm* — Wiley Rein LLP

(57) ABSTRACT

Systems and methods are provided for identifying a product in an image and outputting stock keeping units of the product. The system comprises three main components: a database server, a data analytics system and a standard dashboard. The database server contains real-time inventory images as well as historical images of each product type. The data analytics system is executed by a computer processor configured to apply object detection and classification and deep learning algorithms to detect product information captured by the image. The data analytics system is also configured to determine hierarchical classification categories for the product. The standard dashboard is configured to output a report regarding the product information.

24 Claims, 6 Drawing Sheets

SYSTEM AND METHOD FOR IDENTIFYING OBJECT INFORMATION IN IMAGE OR VIDEO DATA

RELATED APPLICATIONS

This application claims priority benefit of Indian Patent Application No. 202021013271, filed Mar. 26, 2020, which are incorporated entirely by reference herein for all purposes.

FIELD

The present disclosure relates generally to image processing, and more specifically to systems and methods of identifying objection information in image or video data.

BACKGROUND ART

One of the biggest investments for the marketing organization of a Consumer Packaged Goods (CPG) company is retail audits to ensure that the product is positioned in the way that makes it most appealing to the consumer, the product is consistently displayed to maximize sales, and availability of the products to prevent out-of-stock.

Traditionally, the retail audits are conducted manually, which is time-consuming and costly. Artificial intelligent (AI) technology provides the potential for significant improvements in audit speed and quality. With large number of data sets comprising thousands of shelf images, companies can now leverage of AI to better monitor their retail shelf presence. AI will help in recognizing product conditions on shelf such as availability, assortments, space, pricing, promotions and many more. It will empower companies to take immediate corrective. AI algorithms can definitely improve planogram compliance by providing accurate stock visibility insights. Companies will be able to monitor and benchmark duration of out of stock instances, which will lead to better in-store product placement. See U.S. Pat. No. 10,387,996 and U.S. Patent Application Publication No. US2019019756.

Current industry has a lot of bottlenecks that affects final insights in which failure to analyze unclear images is a major issue. This leads to increase in time and cost to the company to retrieve new images for fresh analysis. Field agents will just have to click pictures of all the relevant shelves and feed it to the AI system. Obstruction while the field agents click shelf pictures is another damper in the retail audit process.

Therefore, there is still a need for an improved AI technology platform and computer network implemented method to analyze image or video data at a more granular level for real time sensing of behavior, needs and perception. There is a further need for a technology platform and computer network implemented method for generating insight at various levels for continuous evaluation and automated promotion.

SUMMARY OF THE INVENTION

The instant disclosure describes various techniques that overcome the above noted limitations of prior art techniques through the use of deep learning neural network-based image analysis techniques including, but not limited to, object recognition and classification analysis techniques applied to images obtained by one or more image capture devices.

The present invention provides a method and system to automatically analyze image or video data to identify all the products caught by the image or video and output product attributes. The present invention devised a machine learning algorithm to detect stock keeping units (SKUs) of the products and associated statistics and key performance indicator (KPI).

An aspect of the present invention is a system for identifying a product in an image and outputting stock keeping units of the product, such as brand, manufacturer, description, material, size, color, packaging and warranty terms. The system comprises three main components: a database server, a data analytics system and a standard dashboard. The cloud database contains real-time inventory images as well as historical images of each product type. The data analytics system is executed by a computer processor configured to apply object detection and classification and deep learning algorithms to detect product information captured by the image. The data analytics system is also configured to determine hierarchical classification categories for the product. The standard dashboard is configured to output a report regarding the product information.

At least one aspect is directed to a method of identifying products in an image and outputting stock keeping units of the product. The method can include receiving an input image, via application programming interface from a recording device or an external database. The method can include generating an output characterizing an object presented within the image, via an object detection component of a first neural network in a data analytics system. The method can include receiving the output generated by the first neural network by a second neural network and processing the output, via an object classification component of the second deep neural network in the data analytics system, to determine hierarchical classification categories comprising a first level classification category of the object, a second level classification category of the object and a third level classification category of the object. The method can include generating a descriptor of the object based on at least one of the first level classification category, the second level classification category and the third level classification category of the object, via the data analytics system. The method can include reporting the descriptor of the object, via a standard dashboard.

One embodiment may provide a system for identifying a product in an image and outputting stock keeping units of the product, comprising:

a database server executed by one or more storage devices for storing image data comprising real-time inventory images and historical images of each product type;

a data analytics system executed by one or more computers; and a standard dashboard executed by one or more computers;

wherein the data analytics system comprises instructions that when executed by the one or more computers cause the one or more computers to perform operations comprising:

receiving an input image, via application programming interface from a recording device or an external database;

generating an output characterizing an object presented within the image, via an object detection component of a first neural network in the data analytics system;

receiving the output generated by the first neural network, via a second neural network;

processing the output, via an object classification component of the second neural network in the data analytics system, to determine hierarchical classification categories comprising a first level classification category of the object, a second level classification category of the object and a third level classification category of the object; and generating a descriptor of the object based on at least one of the first level classification category, the second level classification category and the third level classification category of the object, via the data analytics system; and wherein the standard dashboard is configured to output the descriptor of the object.

An additional embodiment herein provides a method for identifying a product in an image and outputting stock keeping units of the product, comprising receiving an input image, via application programming interface from a recording device or an external database;

generating an output characterizing an object presented within the image, via an object detection component of a first deep neural network in a data analytics system;

receiving the output generated by the first neural network, via a second neural network;

processing the output, via an object classification component of the second neural network in the data analytics system, to determine hierarchical classification categories comprising a first level classification category of the object, a second level classification category of the object and a third level classification category of the object;

generating a descriptor of the object based on at least one of the first level classification category, the second level classification category and the third level classification category of the object, via the data analytics system; and outputting the descriptor of the object, via a standard dashboard.

A further embodiment herein provides a system for identifying a product in an image and outputting stock keeping units of the product, comprising:

a database server executed by one or more storage devices for storing image data comprising real-time inventory images and historical images of each product type;

a data analytics system executed by one or more computers; and a standard dashboard;

wherein the data analytics system comprises instructions that when executed by the one or more computers cause the one or more computers to perform operations comprising:

receiving an input image, via application programming interface from a recording device or an external database;

generating an output characterizing an object presented within the image, via an object detection component of a first neural network in the data analytics system;

generating a first descriptor for the object based on the output, via the first neural network in the data analytics system;

receiving the output and the first descriptor generated by the first neural network, via a second neural network;

processing the output, via an object classification component of the second neural network in the data analytics system, to determine hierarchical classification categories comprising a first level classification category of the object, a second level classification category of the object and a third level classification category of the object; and generating a second descriptor of the object based on at least one of the first level classification category, the second level classification category and the third level classification category of the object, via the data analytics system;

and wherein the standard dashboard is configured to output the first and second descriptor of the object.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

Figure 1:
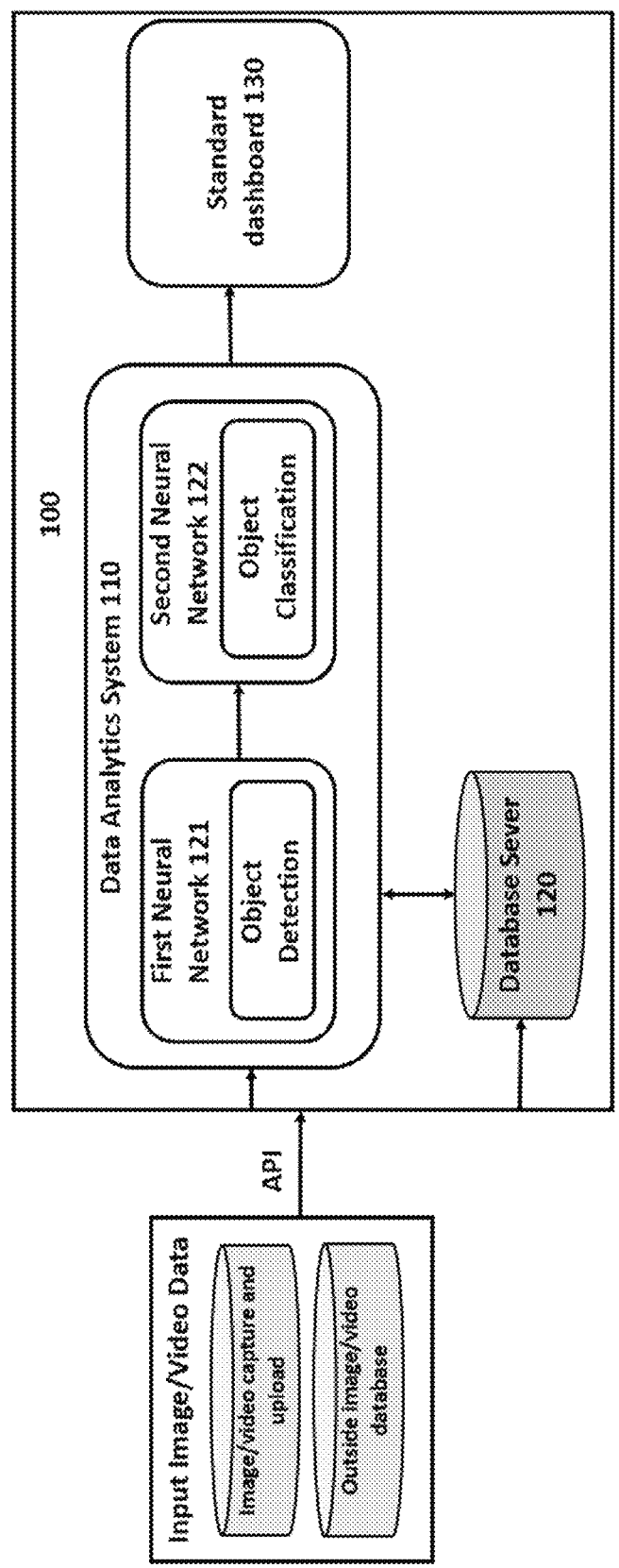
FIG. 1 depicts the components of the system for identifying products in an image or video and outputting product SKUs.

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Deep learning" refers to a subfield of machine learning concerned with algorithms inspired by the structure and function of the brain called artificial neural networks.

"Convolutional neural network (CNN)" a class of deep neural networks, most commonly applied to analysing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing.

"Recurrent neural network (RNN)" is a class of artificial neural networks where connections between nodes form a directed graph along a temporal sequence. This allows it to exhibit temporal dynamic behaviour. Unlike feedforward neural networks, RNNs can use their internal state (memory) to process sequences of inputs. This makes them applicable to tasks such as unsegmented, connected handwriting recognition or speech recognition.

"Artificial neural networks (ANN)" or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analysing example images that have been manually labelled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

A "multilayer perceptron (MLP)" is a class of feedforward artificial neural network (ANN). The term MLP is used ambiguously, sometimes loosely to refer to any feedforward ANN, sometimes strictly to refer to networks composed of multiple layers of perceptrons (with threshold activation). Multilayer perceptrons are sometimes colloquially referred to as "vanilla" neural networks, especially when they have a single hidden layer.

"Unsupervised machine learning (ML)" refers to unsupervised machine learning algorithms that gather patterns from a dataset without reference to known, or labelled outcomes.

"Upsample" refers to any technique that upsamples image to a higher resolution.

"Application programming interface (API)" is an interface or communication protocol between different parts of a computer program intended to simplify the implementation and maintenance of software.

"Decision-tree" is a decision support tool that uses a tree-like model of decisions and their possible consequences, including chance event outcomes, resource costs, and utility. It is one way to display an algorithm that only contains conditional control statements.

"Microservice" are a software development technique—a variant of the service-oriented architecture (SOA) structural style—that arranges an application as a collection of loosely coupled services. In a microservices architecture, services are fine-grained and the protocols are lightweight.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

FIG. 1 depicts an exemplary system for identifying products in an image and outputting product SKUs. The system 100 comprises three main components: a data analytics system 110, a database server 120, and a standard dashboard 130. The database server 120 contains real-time inventory images as well as historical images of each product type. The data analytics system 110 is executed by a computer processor configured to apply deep learning algorithms to detect product information captured by the image. The standard dashboard is configured to output a report regarding the product information. The present system may apply to video data following a similar architecture.

The present invention uses microservice API infrastructure to allow real time data processing. In a microservice environment, a real time API proxy makes it easy to listen for instant updates from other micro services without the need for a centralized message broker. Each microservice gets its own proxy instance, and microservices communicate with each other via an organization's own API contracts rather than a vendor-specific mechanism.

"Support-vector machines (SVM)" are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on the side of the gap on which they fall.

Data analytics system 110, database server 120, and standard dashboard 130 may be any type of computer device, including but not limited to a personal computer, a server computer, a series of server computers, a mini computer, and a mainframe computer, or combinations thereof. Data analytics system 110, database server 120, and standard dashboard 130 may each be a web server (or a series of servers) running a network operating system. database server 120 connects to one or more external data sources, including real-time camera capturing images, through one or more networks, including but not limited to, local-area networks (LANs), wide-area networks (WANs), world wide web (WWW), or any combination thereof.

Data analytics system 110 may comprise two neural networks 121 and 122. The first neural network 121 comprises an object detection module and the second neural network 122 comprises an object classification module. The data analytics system may contains more than two neural networks arranged in a sequence, wherein an output generated by a neural network may be fed into the subsequent neural network.

An object detection module applies generalized instance segmentation for accurate product extraction. Segmentation separates a given image into a foreground (a portion to be extracted) and a background (the remaining portion) by means of digital image processing using a computer. Quick and accurate segmentation is desired for a segmentation process. Current segmentation technique such as Yolov3, and RetinaNet do not cancel the background. In contrast, the instance segmentation algorithms in the present proprietary system extracts the products at individual level and masks the products out with any other information.

In general, the image semantic segmentation is achieved based on convolutional neural networks (CNNs). To this end, the data analytics system 110 is trained using the training data stored in the database server 120 or from outside database. The training data includes a plurality of training images. The semantic category of each pixel in each training image is determined in advance. For example, the semantic category of pixels in the training images can be obtained by user labeling. The parameters and/or coefficients of the modules/logic in the data analytics system 110 are then modified according to the training images in order to train the CNNs.

Figure 2:
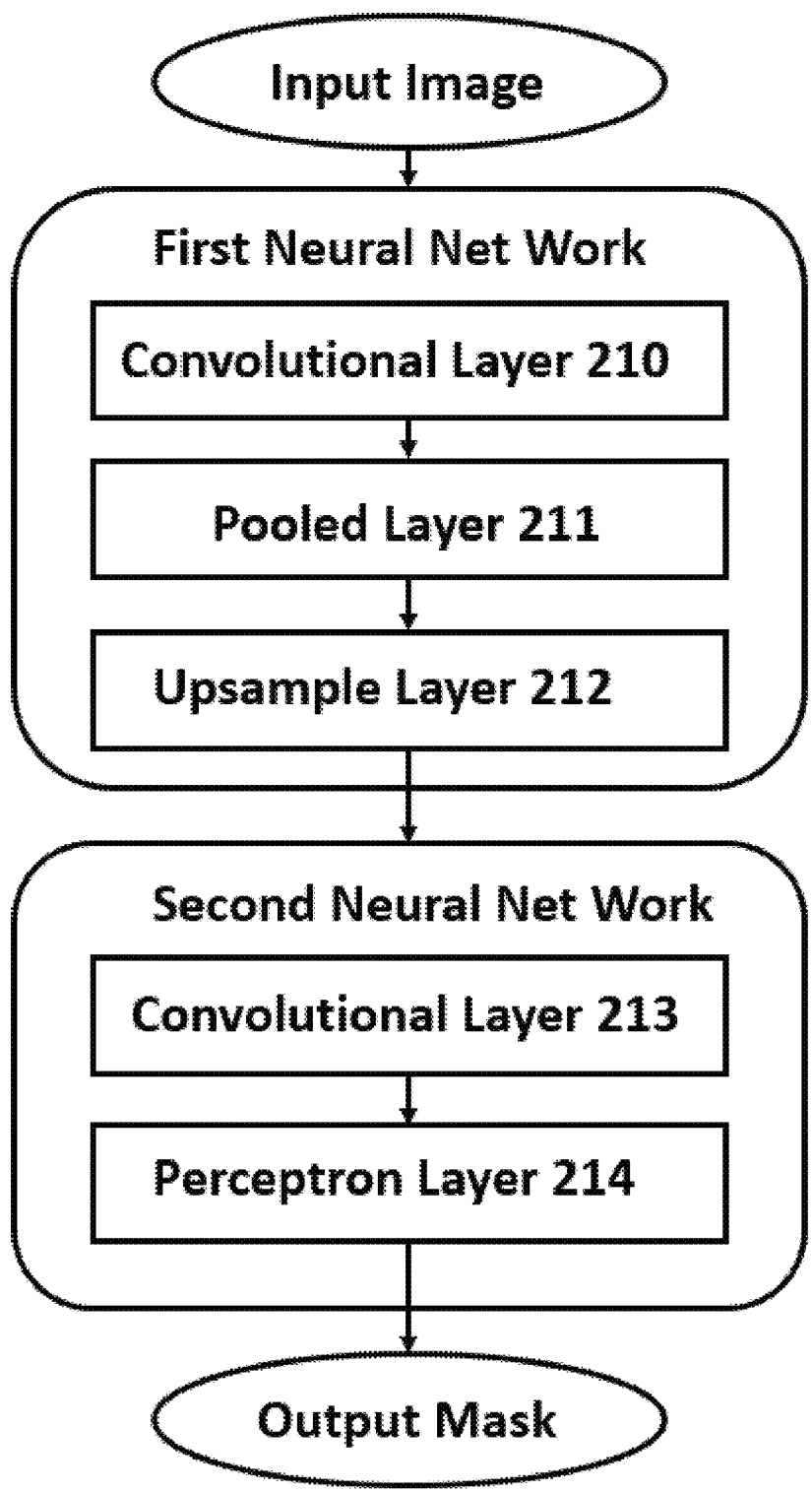
FIG. 2 shows a block diagram of the convolutional neural networks.

FIG. 2 shows a block diagram of the convolutional neural networks in accordance with example implementations of the subject matter described herein. The data analytics system 110 comprises two sequential neural networks. The first neural network extracts the product from the image, highlights or enhance the quality of images to refine results and send it to a second neural network. The first neural network uses a hybrid neural network model that combine convolutional neural network (CNN) and multilayer perceptron (MLP) architecture.

The first neural network comprises a convolutional layer 210 for performing convolution filtering on the input image. As used herein, a "layer" refers to one or more modules or logic for performing specific operations. The convolutional layer 210 includes a plurality of the convolution filters. The convolution filters in the first convolutional layer apply convolution filtering on the input image to be segmented. The results are referred to "convolutional feature maps" or "feature maps." The feature maps record the strength and spatial locations of the responses of the filters on the respective channels. The number of channels is defined by the number of the convolution filters in the convolutional layer.

The feature map of each channel includes activations that record the semantic information for the respective regions in the image. More particularly, the semantic information is indicated by the strength of activations and each activation in the convolutional feature maps is contributed by a receptive field in the image domain.

The convolutional layer 210 further includes a convolutional feature masking (CFM) layer that masks the convolutional feature maps generated by the convolutional layers to produce segment features. The segment features are fed into a segmentation module for image semantic segmentation.

The CFM layer is configured to mask the feature maps. That is, the masking is performed on the convolutional features rather than the raw image. To this end, binary masks are obtained from the segment proposals in the image. As used herein, a segment proposal refers to a candidate segment to be classified for semantic segmentation. Given the input image, a set of candidate segments may be obtained in a variety of ways.

In accordance with implementations of the subject matter described herein, segment features are extracted from the feature maps which are obtained by convoluting the image. More particularly, the binary masks, which are generated from the candidate segments of the image, are used to mask the feature maps instead of the raw image. The resulting segment features will be used in the image semantic segmentation. Because the convolutional features are computed from the unmasked image, their quality is not impacted. In the meantime, the image semantic segmentation can be done efficiently since the convolutional feature maps only need to be computed once. Moreover, the artificial boundaries can be avoided.

Each candidate segment may be presented by a binary mask. The binary mask may the foreground mask and enclosing bounding box. The binary mask is defined by the bounding box of the candidate segment. Within the mask, the values of pixels located inside the candidate segment are set to one, while the values of pixels in the other part are set to zero.

The CFM layer provides the segment features to a segmentation module. The segmentation module is configured to determine a semantic category for each pixel in the image at least in part based on the segment features. The output of the CMF layer may be fed to a classifier in the segmentation module to determine the semantic category to which each pixel in the image belongs.

It is to be understood that the data analytics system 110 can be used in both training and the image segmentation. In training, the parameters and/or coefficients of the convolutional layers 210 can be adapted based on the training data. In addition, or alternatively, the underlying probabilistic distributions of the samples can be modified. In the testing phase, these modules work together to achieve the sematic segmentation of an input image.

The feature maps generated by the convolutional layer 210 are fed into the CFM layer for masking a set of segment proposals or candidate segments. Each of the candidate segments may be represented by a binary mask. The binary masks are also input into the CFM layer. That is, in such implementation, the CFM layer operates on the full-image convolutional feature maps.

In such implementations, the segmentation module includes a pooling layer 211. The pooling layer 211 receives and pools the segment features generated by the CFM layers. As known, the spatial pooling combines the responses of features obtained at nearby locations into some statistic that summarizes the joint distribution of the feature over the region of interests. By means of pooling, the segment features (in terms of its bounding box) are adapted to a fixed-length output. Any suitable pooling technologies, either currently known or to be developed in the future, can be used. By way of example, in one implementation, the pooling layer 211 may apply spatial pyramid pooling (SPP).

The pooled segment features may be fed a upsample layer 212 to perform a backwards convolutional operation to enhance the dimensions of the input to perform a backwards convolutional operation to enhance the dimensions of the input.

The upsample layer 212 is fed into a second convolutional layer 213 in the second neural network. The feature maps produced by the second convolutional layer 213 are provided to a second CFM. It is to be understood that feature maps need to be computed only once, which would be beneficial to the efficiency of the image segmentation.

The output of the second CMF layer may be fed to a SKU classifier in the object classification module of the second neural network. The SKU classifier classifies or identifies the objects in image using brand or SKU classifier, object size and shape. The second neural network classifiers enable calculation or processing of quantitative measures of the product. When an image is identified without a classifier, either of the neural network is trained based on whether the object detection fails or the SKU detection is failed.

The output of the second convolutional layer 213 is fed to into a perceptron layer 214. The perceptron layer 214 is suitable for classification prediction problems where inputs are assigned a class or label. The perceptron layer 214 are also suitable for regression prediction problems where a real-valued quantity is predicted given a set of inputs.

Figure 3:
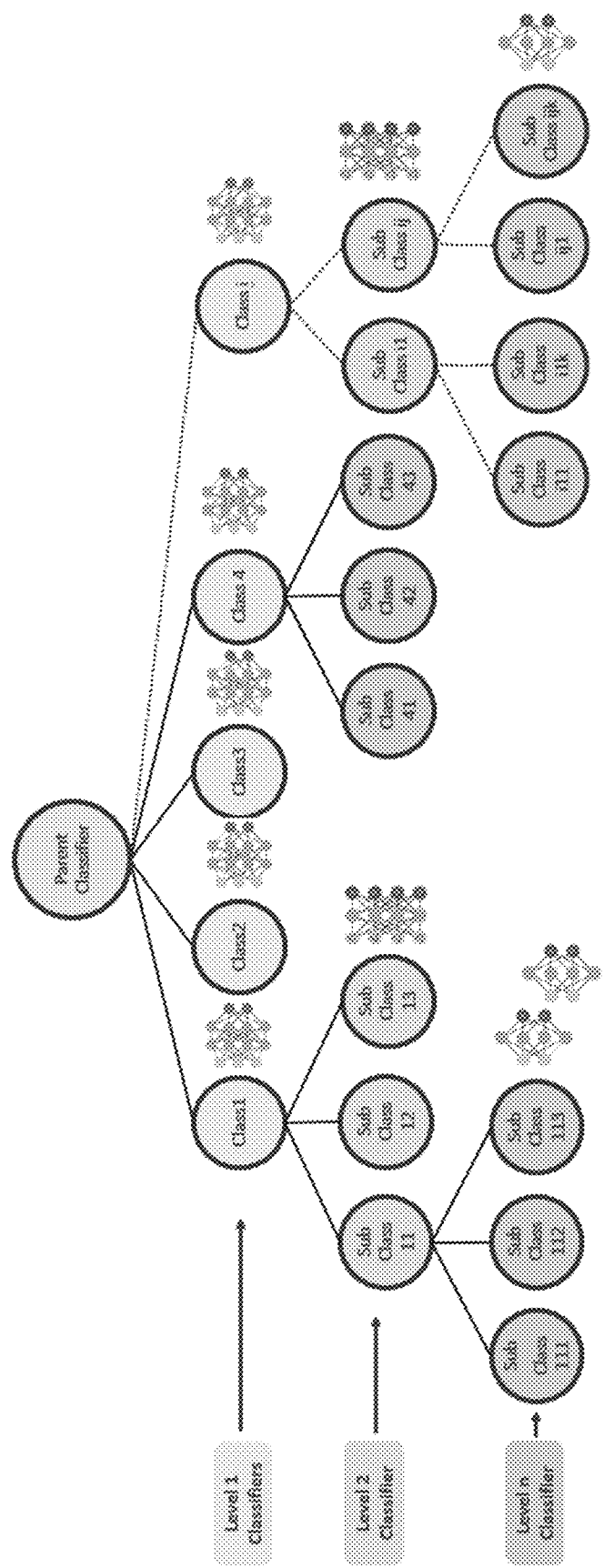
FIG. 3 illustrates an example of the graph model based deep learning object classifier.

FIG. 3 illustrates an example of the graph model based deep learning object classifier. The object classification component of the second neural network in the data analytics system can determine hierarchical classification categories comprising a first level classification category, for example brand classifier of an object, a second level classification category, for example sub brand classifier of the object, and a third level classification category, for example SKU classifier of the object. Here, Stock Keeping Units (SKUs) refer to items of stock that are completely specific as to function, style, size, color, and, usually, location. Various approaches and techniques exist to classify SKUs. See Van Kampen et al., *SKU classification: A literature review and conceptual framework*, International Journal of Operations and Production Management (2012).

The graph model based deep learning object classifier of the present invention is context aware. The object sizes and shapes are taken into consideration while classifying at the third level classification category, such as at SKU classifier level. The classifier of the present invention allows easy scale-up and expansion without changing the entire model architecture. The classifiers run in hierarchical classification categories significantly decrease the run time.

The data analytics system can generate a descriptor of the object based on at least one of the first level classification category of an object, the second level classification category of the object, and the third level classification category of the object.

The object classification component can query or compare the object against a convolutional neural network (CNN), recurrent neural network (RNN), other artificial neural network (ANN), or against a spatio-temporal memory network (that can be collectively referred to as a deep neural network (DNN)) that has been previously trained, for example to recognize different products. The DNN can be part of the data analytics system, that utilizes the database 120, or a separate system in communication with the data analytics system 110, for example via the computer network. The result of the comparison of the object with the DNN can indicate that the object is, for example, coke. The object classification component can provide this information—e.g., a first level classification category—as output that can be stored in the database 120 and accessed by the data analytics system to correlate the object having this first level classification category with other objects that also have the first level classification category (e.g., descriptor) of, for example, "Coca-Cola coke".

The object classification component can also determine a second level classification category for the object. The second level classification category can include a sub-brand of the object. For example, when the first level classification category indicates that the object is a Coca-Cola coke, the second level classification category can indicate that the object is a Coca-Cola Zero, Coca-Cola Light, or Coca-Cola Energy.

The object classification component can also determine a third level classification category for the object. The second level classification category can include SKUs of the object. For example, when the first level classification category indicates that the object is a Coca-Cola coke and the second level classification category can indicate that the object is a Coca-Cola Zero, Coca-Cola Light, or Coca-Cola Energy, the third level classification category can indicate the Coca-Cola Energy is currently available in the United Kingdom and has 114 mg of caffeine in each 12-ounce serving.

The classification categories can be hierarchical, where for example the second level classification category is a subset or refinement of the first level classification category. For example, the object classification component can determine the second level classification category of the object from a list of available choices or verticals for or associated with the first level classification category. Each classification level category can represent a more fine grained or detailed elaboration.

The data analytics system can generate at least one descriptor (e.g., a feature vector) for the object(s) present, for example, in an image obtained from a recording device. The descriptor can describe the first, second, and third level classification categories for the detected objects. For example, the descriptor for the first level classification category is "Coca-Cola coke", for the second level classification category is "Coca-Cola Energy", and for the third level classification category is "currently available in the United Kingdom".

The classification categories and descriptors associated with detected objects can be stored as data structures (e.g., using locality-sensitive hashing (LSH) as part of an index data structure or inverted index) in the database 120 and can be accessed by components of the data analytics system as well as the end user computing device.

A further embodiment provides an object detection module in the first neural network 121 which is configured to detect object(s) and generate a descriptor for the object(s). For example, the object detection module detects a number of objects captured in an image of a retail shelf as boxes and then generates a descriptor "product" for these objects. The object classification component of the second neural network in the data analytics system can determine hierarchical classification categories comprising a first level classification category, for example, shampoo, a type classifier of an object; a second level classification category, for example, Pantene, a brand classifier of the object; and a third level classification category, for example, Pantene Prov-V sub-brand classifier of the object.

Figure 4:
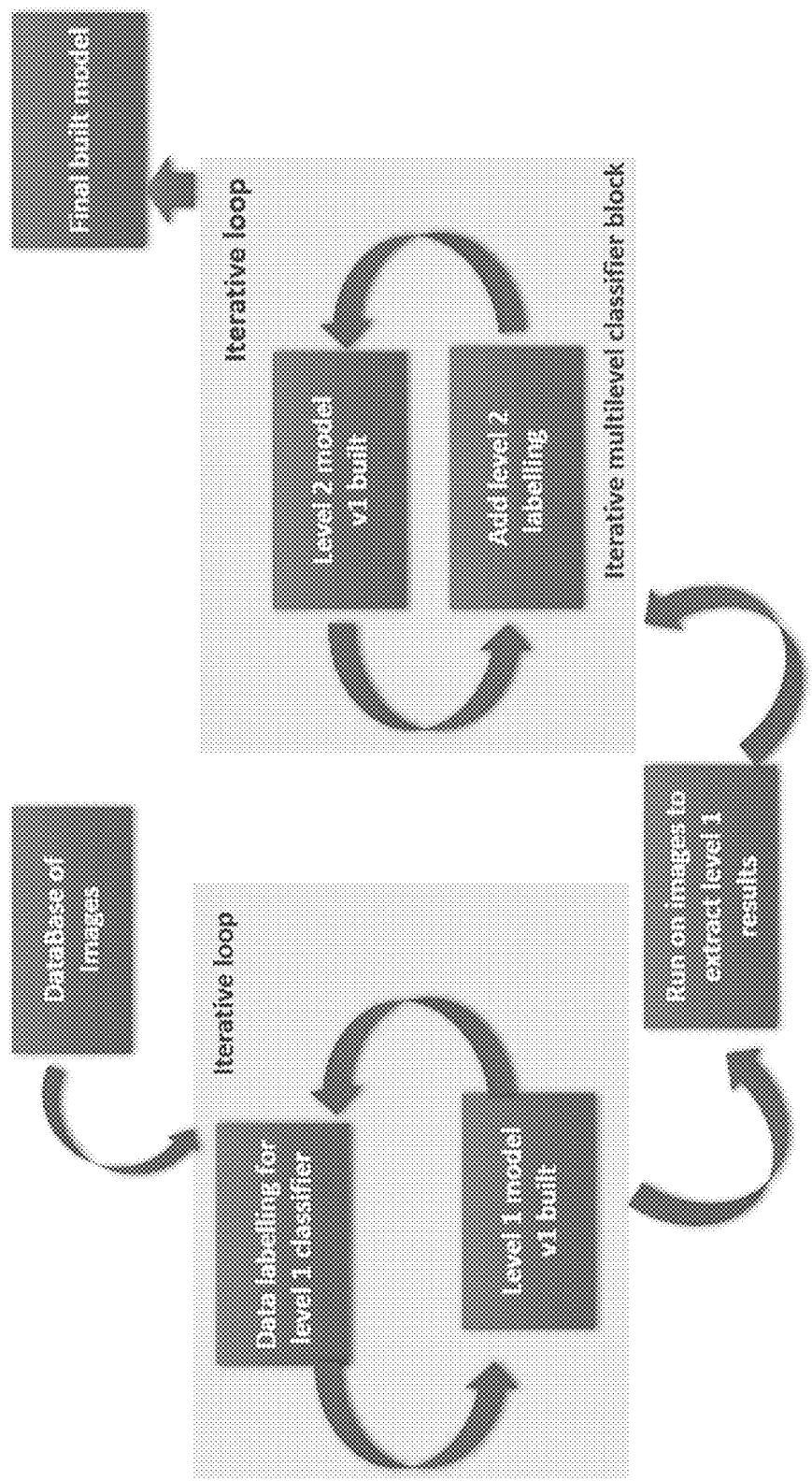
FIG. 4 shows an exemplary model building process for a hierarchical classification.

FIG. 4 illustrates an exemplary model building process for a hierarchical classification that operates in two steps. The training set from the database server 120 as shown in FIG. 1 is used to train conventional classification algorithms, such as decision-trees and support vector machines, to produce a hierarchy of classifiers, defined by a set of predictive attribute values, and its class label. In the second step, the classification model is used to classify new examples whose class labels are unknown.

The training process is an end-to-end (E2E) automated learning process to train the present deep neural network's (DNNs). DNNs structure comprises several layers to solve complex tasks and each DNN layer (or group of layers) is able to specialize to perform intermediate tasks necessary for such problems.

For example, the traditional approach for speech recognition follows the sequence:

Audio (input)->feature extraction->phoneme detection->word composition->text transcript (output).

A clear limitation of this pipelined architecture is that each module has to be optimized separately under different criteria. The E2E approach consists in replacing the aforementioned chain for a single Neural Network, allowing to use a single optimization criterion for enhancing the system:

Audio (input)→(NN)→transcript (output)

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

Examples

1. Application of Graphical Representation of Image Processing Tasks to Hardware Damages Assessment The present invention may be used for identifying hardware damages from real time images. Factories are increasingly looking for fast and effective means to quickly and frequently survey and communicate the condition of running equipment so that essential repairs and maintenance work can be done in a proactive and timely manner before it becomes too dangerous and expensive. Traditional methods for this type of work commonly comprise of engaging factory surveyors to undertake a condition assessment which involves a lengthy site inspection to produce a systematic recording of the physical condition of the equipment elements, including cost estimates of immediate and projected long-term costs of renewal, repair and maintenance of the equipment. Current asset condition assessment procedures are extensively time consuming, laborious, and expensive. This present invention addresses these challenges through an automated detection and localisation of key equipment defects from images.

In phase 1, classifier models for different hardware are built for identification of category of components/hardware present/visible in the image. Classifier models for different subparts of a hardware are built for identification of zones of component/hardware present/visible in the image.

In phase 2, damage presence detector is built for detecting the presence of damage in sub-part of the component visible in an image. Object detection/image segmentation models are built to localize and classify the type of damage on the machinery.

2. Application of Graphical Representation of Image Processing Tasks to Security Surveillance Solution.

The current age of technology generates a tremendous amount of data very instant throughout the world. Among them, amount of video data generated is having a major share. Education, healthcare, tours and travels, food and culture, geographical exploration, agriculture, safety and security, entertainment etc., are the key areas where a tremendous amount of video data is generated every day. A major share among it are taken by the daily used surveillance data captured from the security purpose camera and are recorded every day. Storage, retrieval, processing, and analysis of such gigantic data require some specific platform. The present invention may be applied to analyze video surveillance data.

The present invention performs root cause analysis to understand people flows that can help pre-empt anomalies and improve efficiencies. The present invention uses statistical machine learning techniques to develop solution framework to analyze employees' behavior flows at various access points to identify anomalous activities. The present invention develops an interactive dashboard that enables tracking by harmonizing multi source data.

In conventional systems, such as conventional neural networks, a user may annotate (e.g., visually identify) the action in a video with a bounding-box. The annotation may be used to train a conventional neural network, or other classifiers, on the video samples. For example, a user may present a sequence of frames of a long jump and may annotate the portions of the frames that correlate to the long jump action. In this example, the conventional neural network uses the annotated action to learn the long jump action. Furthermore, based on the learning, the conventional neural network may identify a long jump action in a new frame sequences presented to the conventional neural network after the training is complete. The new frame sequence refers to a frame sequence that was not used (e.g., seen) during training.

In contrast to conventional systems, aspects of the present disclosure are directed to an attention recurrent neural network (RNN) that generates attention feature maps for each frame of a frame sequence. Each attention feature map of each frame indicates one or more potential actions, moving objects, and/or events. The potential actions, moving objects, and/or events may be referred to as an action proposal. In one configuration, the attention recurrent neural network is trained on action class labels provided for an input frame sequence. That is, the attention recurrent neural network is trained to classify frames based on an identified action. Furthermore, in one configuration, the bounding-boxes are generated from an attention map that captures the action. Although described generally with respect to recurrent neural networks, the present disclosure can employ a particular type of recurrent neural network, such as a long short-term memory (LSTM) network.

A deep learning neural network may be trained with action class labels. Training is performed with multiple video samples for each action class label. "Action localization" may refer to providing (e.g., identifying) the action locations by bounding-boxes and identifying the action class. The locations may be found after temporal smoothing and also after obtaining class labels with the attention recurrent neural network. The temporal smoothing may be applied locally on the bounding-boxes spanning a specific number of consecutive frames within a time period. Additionally, weighted linear regression may be applied over the coordinates of bounding-boxes spanning a set of thirty frames from a sequence of frames. The bounding-box may be provided when the recurrent neural network is trained with an action class label but not necessarily. Additionally, or alternatively, the method (e.g., via the RNN) may provide the bounding-box location if a lexicon of trained networks for various actions is available.

Training outputs generated by the first machine learning tool in response to the training inputs may be clustered into groups or clusters of mutual confusion. For example, where a video is provided as a part of a training set to a first machine learning tool configured to perform an action classification function, each of the labels or categories returned by the first machine learning tool as training outputs, e.g., each of the labels or categories identified by the first machine learning tool as being potentially associated with the video, may be grouped together into a cluster. The cluster may include the label or category actually associated with the action, as well as any other labels or categories with which the action is most commonly confused.

3. Application of Graphical Representation of Image Processing Tasks to Retail Shelf Analytics Using image analytics to monitor the contents and status of retail store shelves is an emerging trend with increasing business importance. Detecting and identifying multiple objects on store shelves involves a number of technical challenges. The particular nature of product package design, the arrangement of products on shelves, and the requirement to operate in unconstrained environments are just a few of the issues that must be addressed.

Figure 5:
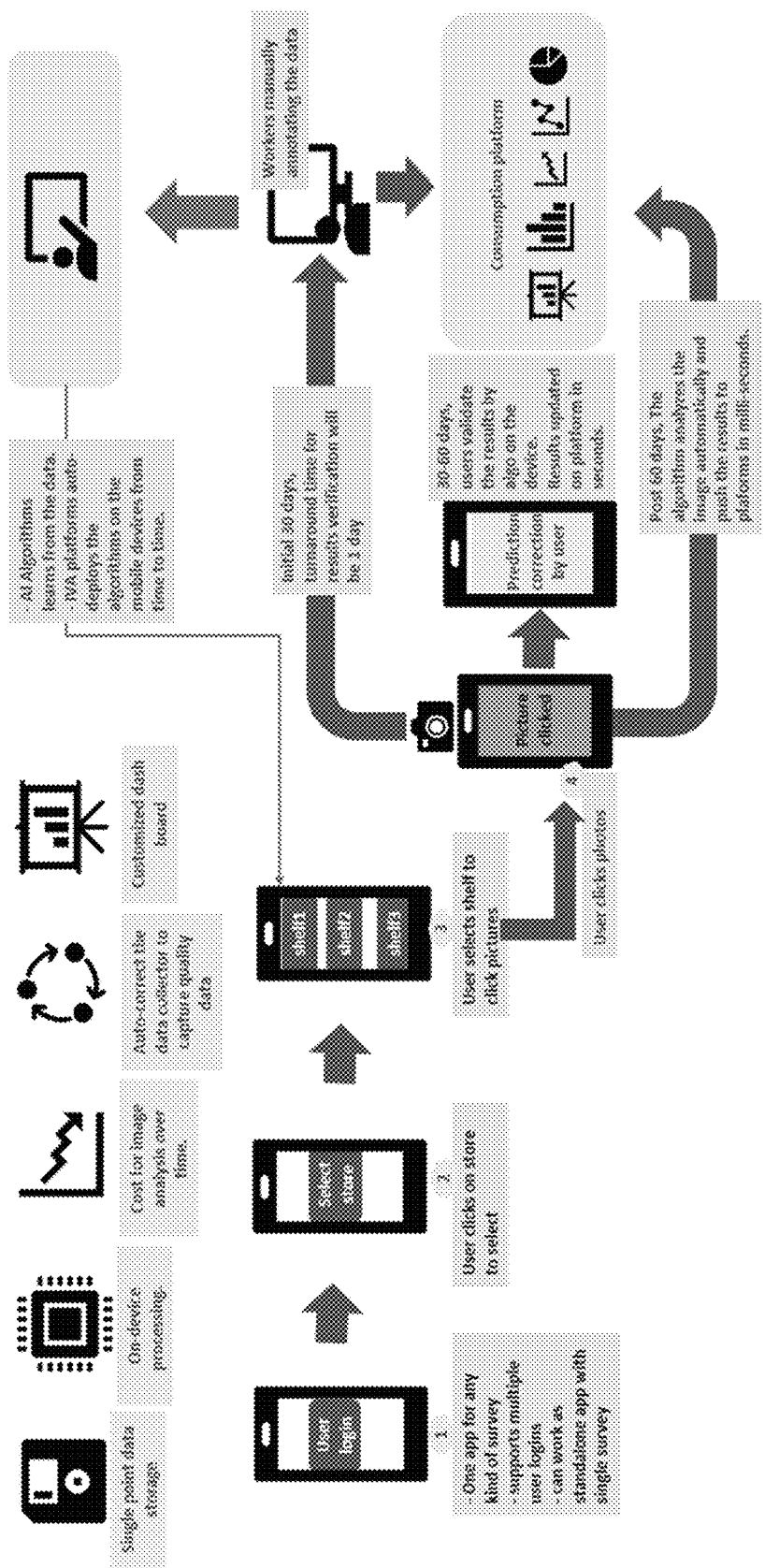
FIG. 5 illustrates an exemplary workflow for retail shelf analytics.
Figure 6:
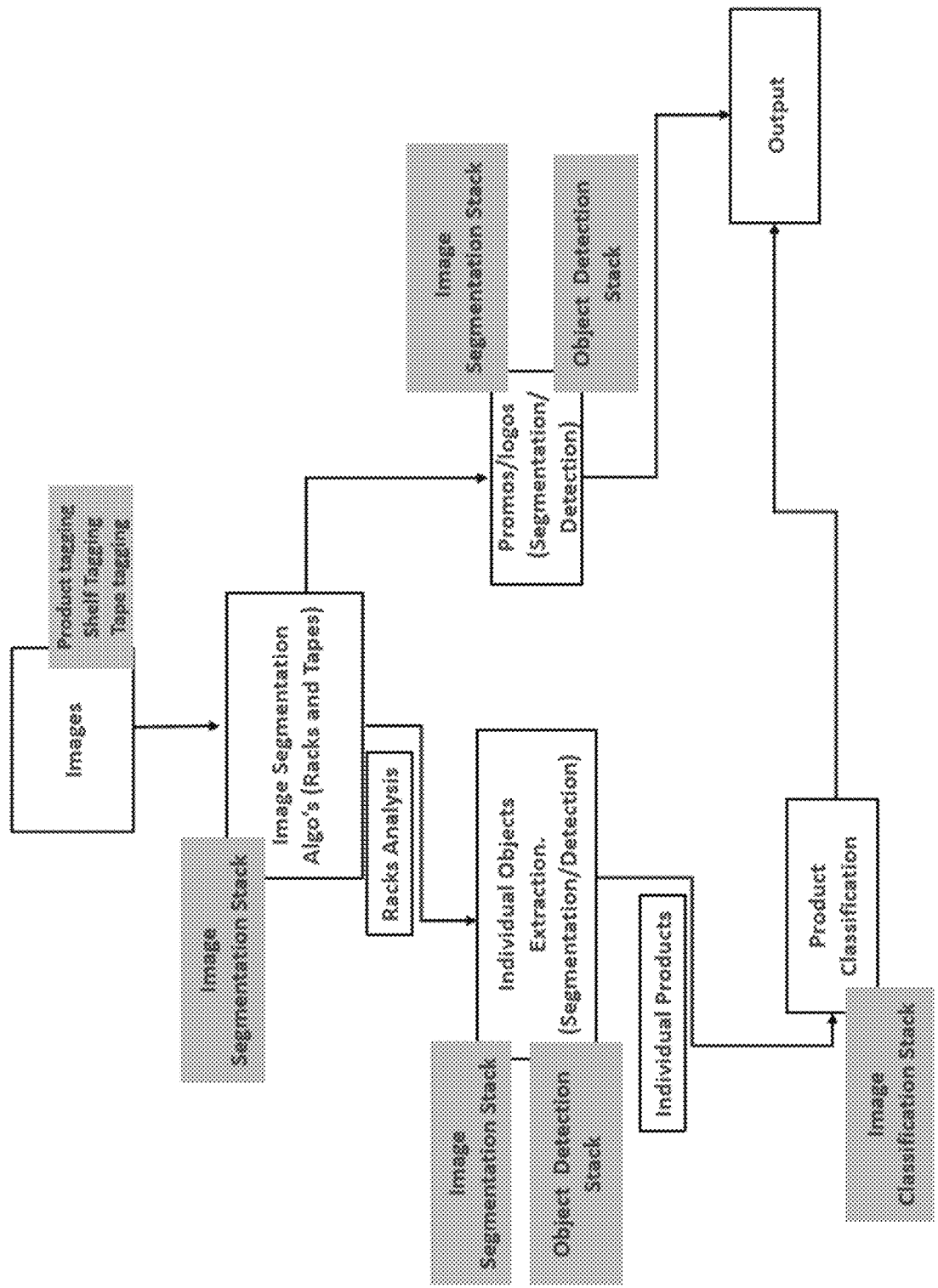
FIG. 6 illustrates the algorithms for object detection and classification.

The present invention addresses these challenges through application of graphical representation of image processing tasks. FIG. 5 illustrates an exemplary workflow for retail shelf analytics. A user may choose to view shelf images through an APP in a mobile device to take pictures of identified shelfs. The images may be generated through fixed cameras, robots or crowdsources. The images may be sent to the present system for object detection and classification followed the algorithms as illustrated in FIG. 6. The system offers store personnel an instant view of shelf status and a list of action items for restocking shelves. The core of the system is based on its ability to achieve high rates of product recognition.

The invention claimed is:
1. A system for identifying a product in an image and outputting stock keeping units of the product, comprising:
 a database server executed by one or more storage devices for storing image data comprising real-time inventory images and historical images of each product type;

a data analytics system executed by one or more computers; and a standard dashboard;

wherein the data analytics system comprises instructions that when executed by the one or more computers cause the one or more computers to perform operations comprising:

receiving an input image, via application programming interface from a recording device or an external database;

generating an output characterizing an object presented within the image, via an object detection component of a first neural network in the data analytics system;

receiving the output generated by the first neural network, via a second neural network;

processing the output, via an object classification component of the second neural network in the data analytics system, to determine hierarchical classification categories comprising a first level classification category of the object, a second level classification category of the object and a third level classification category of the object; and generating a descriptor of the object based on at least one of the first level classification category, the second level classification category and the third level classification category of the object, via the data analytics system;

and wherein the standard dashboard is configured to output the descriptor of the object.

2. The system of claim 1, wherein the application programming interface is microservice based.

3. The system of claim 1, wherein the object detection component applies instance segmentation configured to extract a product at individual level and masks the product out with any other information.

4. The system of claim 3, wherein the instance segmentation is achieved based on convolutional neural network.

5. The system of claim 1, wherein the first neural network comprises a hybrid neural network model consisting of convolutional neural network and multilayer perceptron architecture.

6. The system of claim 5, wherein the first neural network comprising a convolutional layer, a pooled layer and an upsample layer.

7. The system of claim 1, wherein the second neural network comprising a convolutional layer, and a perceptron layer.

8. The system of claim 1, wherein the first and second neural networks are trained in an end-to-end automated learning process.

9. A method for identifying a product in an image and outputting stock keeping units of the product, comprising receiving an input image, via application programming interface from a recording device or an external database;

generating an output characterizing an object presented within the image, via an object detection component of a first neural network in a data analytics system;

receiving the output generated by the first neural network, via a second neural network;

processing the output, via an object classification component of the second neural network in the data analytics system, to determine hierarchical classification categories comprising a first level classification category of the object, a second level classification category of the object and a third level classification category of the object;

generating a descriptor of the object based on at least one of the first level classification category, the second level classification category and the third level classification category of the object, via the data analytics system; and outputting the descriptor of the object, via a standard dashboard.

10. The method of claim 9, wherein the application programming interface is microservice based.

11. The method of claim 9, wherein the object detection component applies instance segmentation configured to extract a product at individual level and masks the product out with any other information.

12. The method of claim 11, wherein the instance segmentation is achieved based on convolutional neural network.

13. The method of claim 9, wherein the first neural network comprises a hybrid neural network model consisting of convolutional neural network and multilayer perceptron architecture.

14. The method of claim 13, wherein the first neural network comprising a convolutional layer, a pooled layer and an upsample layer.

15. The method of claim 9, wherein the second neural network comprising a convolutional layer, and a perceptron layer.

16. The method of claim 9, wherein the first and second neural networks are trained in an end-to-end automated learning process.

17. A system for identifying a product in an image and outputting stock keeping units of the product, comprising:

a database server executed by one or more storage devices for storing image data comprising real-time inventory images and historical images of each product type;

a data analytics system executed by one or more computers; and a standard dashboard;

wherein the data analytics system comprises instructions that when executed by the one or more computers cause the one or more computers to perform operations comprising:

receiving an input image, via application programming interface from a recording device or an external database;

generating an output characterizing an object presented within the image, via an object detection component of a first neural network in the data analytics system;

generating a first descriptor for the object based on the output, via the first neural network in the data analytics system;

receiving the output and the first descriptor generated by the first neural network, via a second neural network;

processing the output, via an object classification component of the second neural network in the data analytics system, to determine hierarchical classification categories comprising a first level classification category of the object, a second level classification category of the object and a third level classification category of the object; and generating a second descriptor of the object based on at least one of the first level classification category, the second level classification category and the third level classification category of the object, via the data analytics system; and wherein the standard dashboard is configured to output the first and second descriptor of the object.

18. The system of claim 17, wherein the application programming interface is microservice based.

19. The system of claim 17, wherein the object detection component applies instance segmentation configured to extract a product at individual level and masks the product out with any other information.

20. The system of claim 19, wherein the instance segmentation is achieved based on convolutional neural network.

21. The system of claim 17, wherein the first neural network comprises a hybrid neural network model consisting of convolutional neural network and multilayer perceptron architecture.

22. The system of claim 21, wherein the first neural network comprising a convolutional layer, a pooled layer and an upsample layer.

23. The system of claim 17, wherein the second neural network comprising a convolutional layer, and a perceptron layer.

24. The system of claim 17, wherein the first and second neural networks are trained in an end-to-end automated learning process.

* * * * *